Figure 1:
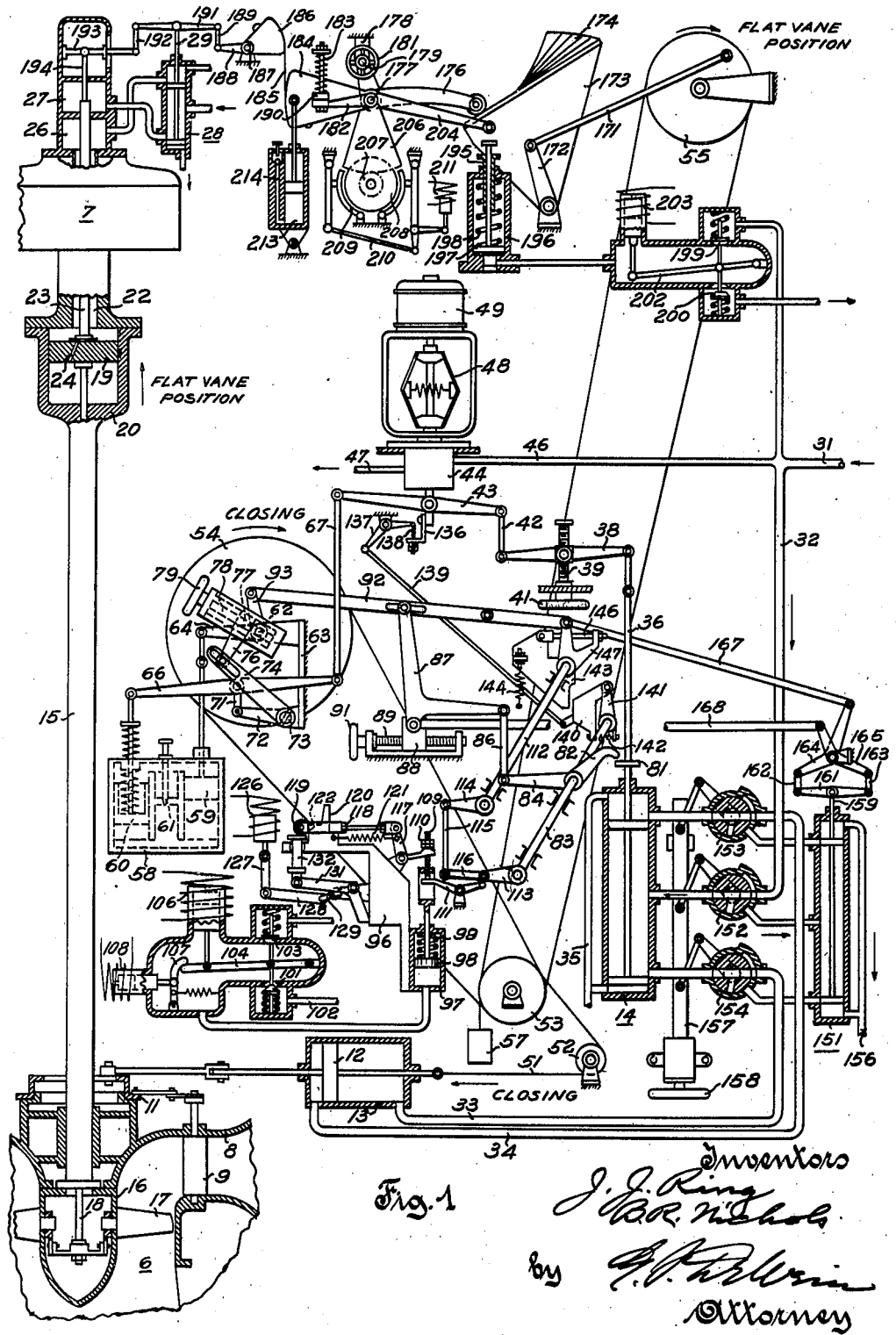

Patented Oct. 12, 1943

2,331,507

UNITED STATES PATENT OFFICE 2,331,507

GOVERNING SYSTEM

Joseph J. Ring, Wauwatosa, and Beverly R. Nichols, Elm Grove, Wis., assignors to Allis-Chalmers Manufacturing Company, Milwaukee, Wis., a corporation of Delaware Application February 8, 1940, Serial No. 317,800

9 Claims. (Cl. 137—158)

This invention relates generally to improvements in governing systems for fluid pressure operated prime movers and more particularly to systems for governing hydraulic turbines of the adjustable runner vane type.

Governing systems for hydraulic turbines of the adjustable runner vane type must provide accurate and quick response to both normal and abnormal operation of the turbine and must also provide for normal maintenance of predetermined relations between the gate controlling the flow of pressure fluid and the positioning of the runner vanes with provision for variation of such relations when desired. When a very sensitive speed responsive element is employed in such governing systems, such element does not become initially effective until the prime mover has come to nearly the desired operating speed and the speed responsive means may, at that time, not be sufficiently quickly responsive to speed variations to prevent overspeeding of the unit. Thus it is desirable to provide governing systems with means for preventing overspeeding of the unit during starting of the unit and of the governing system. A governing system must also be adjustable to permit only a predetermined variation from the desired speed, particularly when a plurality of prime movers are operated in parallel, to permit each of the several units to take on more load when required without causing such rapid alternate taking on and rejection of load as will affect the stability of operation of the prime mover. Due to the fact that some machines have a greater overload capacity than others, it is, however, necessary to provide means for preventing any one machine from taking on an excessive overload while other parallel operating machines are running comparatively underloaded.

When some abnormal condition occurs in the operation of a prime mover, means must be provided which will shut off the flow of fluid to the machine either partially or completely depending on the character of the abnormal condition than existing. If such abnormal condition is only temporary and not dangerous to the machine, the machine should be shut down only to no load synchronous speed, but if the condition is likely to exist for an appreciable time and to become progressively worse until relatively dangerous to the machine, it is necessary to shut off the flow of operating fluid completely in such manner that the machine cannot be restarted until after the abnormal condition has been corrected. Means should also be provided interlocking the normal adjusting means of the governing system with the abnormal condition responsive means, particularly when the normal adjusting means are remotely operated, to prevent any effort on the part of the machine operator to continue operation of the machine in spite of the continuance of abnormal conditions.

In governing hydraulic turbines of the adjustable runner vane type, a fixed relation must be maintained between the degree of gate opening and the setting of the runner vanes which determines the area of water passages between the runner vanes. The runner vane adjusting means must therefore be accurately and rapidly responsive to changes in the position of the gate without any appreciable lag or any tendency to overrun the vane setting required by the then existing gate position. During starting of the turbine, the then normally relatively flat position of the runner vanes is, however, not desirable because when the vanes are in such flat position, it is possible to obtain only a very low torque at a high speed, whereas the starting requirements are a very high torque at a low speed which demands a relatively steep tilt of the runner vanes. The runner vane adjusting means must therefore be provided with means by which its normal operation can be neutralized and by which the requirement for steep tilting of the vanes during the starting operations of the governing system may be met. Under some conditions of operation of the governing system or of the hydraulic turbine itself, it may be necessary to operate the turbine as a fixed runner machine or to conserve the fluid pressure used as the power for operating the governing system. The first above condition is met by providing means for locking the runner vane adjusting means in a fixed position responsive to manual operation or automatically responsive to predetermined conditions, and the second above condition is met by manual or fluid responsive means for interrupting the flow of fluid pressure to the servomotor for positioning the runner vanes.

When a governing system is provided with many automatic means for performing various functions as above indicated, such automatic means may require adjustment or replacement at times when the prime mover must be kept in operation for other reasons. It is therefore desirable to provide means which will cut out or bypass all of the automatic controls excepting the restoring means for returning the control valve to mid-position when such valve controls the flow of pressure to a gate operating servomotor and the maximum load limit means associated with such restoring means. The present invention therefore provides manually operable means for controlling the operation of the turbine without the use of the various automatic means included in the governing system.

It is therefore an object of the present invention to provide a governing system for prime movers in which both normal and abnormal conditions of operation of the prime mover are effective to vary the control of the prime mover by the governing system.

Another object of the invention is to provide a prime mover governing system which includes means for adjustment of the normal starting conditions and for maintaining normal operating speed and load capacity of the prime mover.

Another object of the invention is to provide a prime mover governing system which provides for either partial or complete shut down of the machine dependent on either of several abnormal conditions then existing and in which further adjustment of the governing system is impossible during the existence of such abnormal conditions.

Another object of the invention is to provide a prime mover governing system with manually operable means eliminating the action of automatic portions of the system when operation of the prime mover is required regardless of the action of such automatic means.

Figure 2:
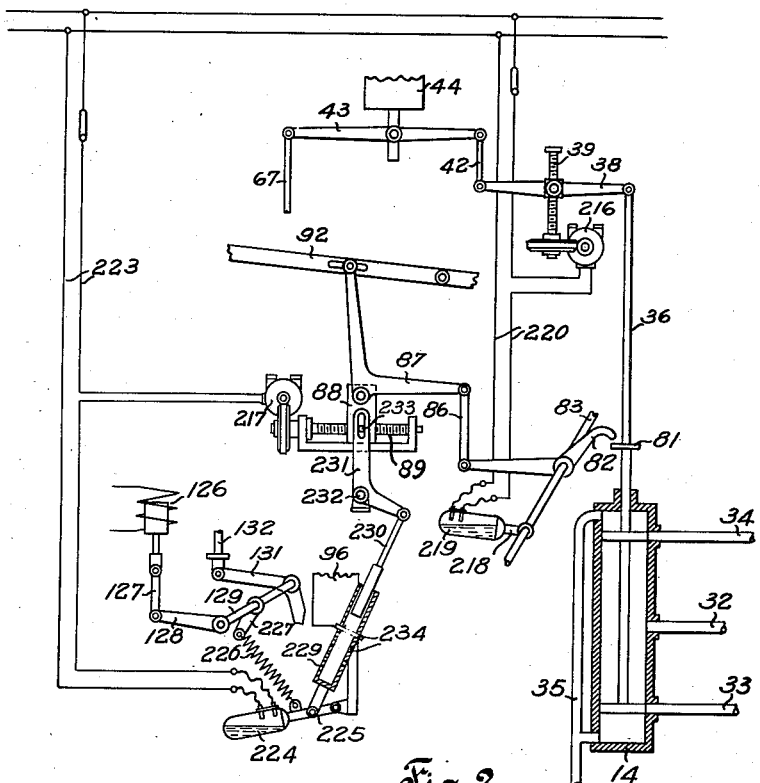

Objects and advantages other than those set forth above, will be apparent from the following description when read in connection with the accompanying drawings, in which:

Fig. 1 diagrammatically illustrates a hydraulic turbine driven electric generating unit having applied thereto an automatic speed and load governing system embodying the various elements and subcombinations of the present invention;

Fig. 2 diagrammatically illustrates the application of remotely controllable means to the synchronizing screw and the load limit screw shown in Fig. 1.

The various elements constituting the present control or governing system are not shown in their relative positions, their true size nor in their relative proportions, but are shown entirely diagrammatically to facilitate explanation of the construction and operation of the system.

Referring to the drawings by characters of reference, the governing system is shown as applied to a prime mover such as a hydraulic turbine generally indicated at 6 and shown as being of the adjustable vane propeller type driving a conventional electric current generator 7. The turbine 6 has the usual casing 8 forming a peripheral water inlet in which are mounted a plurality of movable vanes 9 forming a gate controlling the flow of fluid into the turbine. The term "gate" is intended to include any means used for the purpose of controlling the flow of fluid pressure to any prime mover to which the governing system of the present invention is applicable. Gate vanes 9 are connected by conventional linkage to a shifting ring 11 mounted on the turbine casing for movement into different positions to control the position of the gate vanes and hence to control flow of water into the turbine. The shifting ring 11 is connected with and actuated by a piston 12 movable within a cylinder 13, the piston 12 and cylinder 13 forming a fluid pressure operated servomotor controlled by an automatic pilot valve 14 in the governing system of the present invention.

The turbine 6 is connected with the generator 7 by a hollow shaft 15 which, at its end within the turbine casing 8, is provided with a hub 16 in which are journaled a plurality of propeller vanes 17 extending substantially radially from the hub. The several propeller or runner vanes 17 are interconnected internally of the hub 16 by any one of several known means, to an operating rod 18 which extends upwardly through the shaft 15 to connect with a piston 19 movable within cylinder 20 which is either inserted in or formed as a portion of the shaft 15. It will be understood that the relative positions of the runner vanes govern the area of the fluid flow passages or openings between the vanes and that adjustment of the runner vanes to increase or decrease such area depends on the direction of movement of the vanes. The runner vane operating servomotor 19, 20, is double acting and is operated by fluid pressure admissible to the upper side of the piston 19 through a passageway 22 formed in the shaft 15 and by fluid pressure admissible to the lower side of the piston 19 through a tube 23 extending through the passage 22 in the shaft 15 and communicating with the underside of the piston 19 by way of passage 24 through such piston. The tube 23 is fixedly mounted on the piston 19 and accordingly moves with such piston. Fluid pressure is transmitted either through the passageway 22 or the tube 23 by way of a so-called distributing head having two chambers 26 and 27 connected with the passageway 22 and with the tube 23 respectively. Flow of fluid pressure to the distributing head chambers from a suitable source (not shown) is controlled by a pilot valve 28, the stem 29 of the pilot valve 28 being shiftable automatically to maintain a predetermined relation between the positions of the gate vanes 9 and the runner vanes 17.

Fluid pressure is applied from a suitable source (not shown) to the automatic pilot valve 14 by way of a pipe 31 and a pipe 32 and, under control of the pilot valve, is supplied to the gate operating servomotor 12, 13 through pipes 33 and 34. Pressure is discharged from the servomotor 12, 13 by way of the pilot valve 14 into a pipe 35 leading back to the source of fluid pressure. The stem 36 of the automatic pilot valve 14 is connected with one end of a lever 38 having as its fulcrum a fixedly mounted screw 39 operable locally by means of the hand wheel 41 or remotely by suitable means. The other end of the lever 38 is connected by way of the link 42 with a floating lever 43 of which the fulcrum is formed by the piston of a fluid pressure operated servomotor 44 supplied with pressure through the pipe 46 and discharging through the pipe 47. The supply of fluid through the pipe 46 to the servomotor 44 is controlled by a valve (not shown) which is operated by a flyball structure 48 driven by a motor 49 responsive to the speed of the generator 7. The detailed structure of the servomotor 44, the servomotor control valve, the flyball head 48 and the motor 49 can be seen in Patent No. 2,106,684, issued January 25, 1938 to J. J. Ring, B. R. Nichols and A. Pfau, and such structure is accordingly not shown herein in detail, and will be described only sufficiently to allow comprehension of its functional cooperation with other portions of the present control system. Variations in load on and hence speed of the generator 7 which produce variations in speed of the motor 49 and flyball structure 48, causes movements of the servomotor 44 and the leverage 43, 42 and 38 to actuate the gate pilot valve 14 which moves to admit pressure for operating the gate servomotor 12, 13 and hence to shift the gate 9 in either direction dependent on the sense of the speed change.

Every movement of the gate servomotor piston 12 must be relayed to the flyball floating lever 43 and hence to the gate pilot valve 14 to restore such valve to neutral position after each movement thereof to thereby prevent movement of the gate 9 beyond a desired position. Such relay comprises a cable 51 attached at one end to the gate servomotor piston 12 and passing respectively over pulleys 52, 53, 54 and 55 with the free end of the cable attached to a weight 57 to keep the cable taut. The cable 51 permits location of the servomotor 12, 13 wherever desired and at a distance from the remainder of the governing system. To secure stable operation of the turbine and to allow only a predetermined speed difference between no load and full load gate vane opening to thereby meet requirements from maintenance of the speed and hence of constant frequency of the generator, pulley 54 is connected through a dashpot and linkage with the flyball floating lever 43. The dashpot comprises a casing 58 divided into two chambers by a partition and by pistons 59 and 60 and provided with a valve 61 for controlling the rate of flow of fluid under pressure from one dashpot chamber to the other. Pulley 54 is fixedly mounted on a shaft 62 supported on a fixed bracket 63 and the pulley shaft has fixed thereon an arm 64 connected with the piston 59. The dashpot piston 60 is connected by a lever 66 and a link 67 with one end of the flyball floating lever 43. It will be understood that all movements of the gate vane servomotor 12, 13 are relayed to the floating lever 43 through the dashpot 58 and linkage 64, 66, 67 thus providing means for returning the gate pilot valve 14 to the neutral or mid position after each movement thereof and that such returning actions are subject to the damping action of the dashpot.

Although there must be some speed difference between no load and full load gate vane position to insure stability of operation of the prime mover generating unit, such difference should be kept as small as possible to secure the maximum sensitivity of the governing system to speed changes. Provision must therefore be made to adjust the pilot valve return or restoring means to regulate the speed difference or droop permitted between the two load limits stated. Such means include a link 71 connected with the lever 66 and with an arm 72 pinned on a shaft 73 mounted on the bracket 63. Another arm 74 is also pinned on the shaft 73 and is provided with a slot in which is engaged a pin extending from an arm 75 mounted on a nut 77 traveling on a screw 76 which is rotatable by a hand wheel 79, the arm 76 and its adjusting nut 77 and screw 78 being mounted on and rotatable with the shaft 62. Movement of the nut 77 will increase or decrease the effective length of the arm 74 thus permitting adjustment of the fulcrum point of lever 66 and hence of the speed difference or droop between no load and full load gate vane position to any degree predetermined by load conditions. The percentage of speed droop permitted is increased by lengthening the arm 74 and vice versa, the lengthening being obtained by moving the nut 77 away from the shaft 62.

It is desirable to provide a prime mover governing system with means for limiting the maximum power output thereof or the load which may be applied to the prime mover. Such means are included in the present system and include a collar 81 mounted on the stem 36 of the automatic gate pilot valve 14 which collar 81 is engageable with a finger 82 keyed on a shaft 83. An arm 84 is keyed on the shaft 83 and is connected by way of link 86 with one arm of a bell crank 87 which is pivotally mounted on a nut 88 traveling over a fixedly mounted screw 89 when the screw is rotated by a hand wheel 91. The other end of the crank 87 is provided with a pin engaging in a slot in a rod 92 connected at one end to an arm 93 mounted to rotate with the pulley shaft 62. Upward movement of the pilot valve stem 36, in the direction to cause opening of gate 9 and hence increase of available power of the unit is limited by the setting of the load limit device. As shown in Fig. 1, the load limit device is set in a .5 gate position, that is the pin of crank 87 is centrally located in the slot of rod 92 to prevent opening of gate 9 beyond the .5 position. If the valve 14 is moved in gate opening direction, gate servomotor movement in the opening direction rotates pulley 54 counterclockwise which moves rod 92 toward the left. If the gate opening movement tends to go beyond the .5 gate position, movement of rod 92 causes the pin of crank 87 to engage the right hand end of the slot in rod 92 which rocks crank 87 counterclockwise and moves finger 82 clockwise to engage with collar 81 and pushes valve 14 to mid-position thereby preventing movement of the gate beyond the .5 opening set. It will be apparent that the adjusting nut 88 varies the position of the pin of crank 87 within the slot of rod 92 and thus permits adjustment of the maximum power output of the prime mover unit. The load or power limiting device may be used either for manually securing any desired opening of the gate vanes or for limiting the maximum opening of such gate as has just been described.

Under some conditions of operation of the prime mover generating unit, it may become necessary to close the gate partially to no load synchronous speed position or even to completely interrupt operations of the unit. A portion 96 of the governor base supports a cylinder 97 containing a piston 98 biased toward one end of the cylinder by a compression spring 99. Fluid pressure may be supplied to the cylinder 97 from a suitable source under the control of a valve 101 through a pipe 102. Pressure is discharged from the cylinder 97 under the control of a valve 103. Valves 101 and 103 are connected by a lever 104 which is operable by a normally deenergized solenoid 106, against springs acting on each valve. A latch 107 which is actuated by a normally deenergized solenoid 108 prevents further operation of solenoid 106 and valves 101 and 103 until after such latch has been reset following each operation thereof. The solenoids 106 and 108 are connected for energization responsive to any desired condition of the unit which can be employed to close the several circuits of the solenoids. The rod of the piston 98 is provided at its upper end with a slotted portion from which extends a threaded stem 109 bearing nuts 110 to provide adjustment for the shut down device now being described. One arm of a bell crank 111, mounted adjacent the cylinder 97, extends into the slotted portion of the piston rod for engagement thereby when the oil pressure in the cylinder 97 is released. The other arm of bell crank 111 extends adjacent a linkage between the shaft 83 and a shaft 112, the linkage comprising an arm 113 keyed on shaft 83 and an arm 114 keyed on shaft 112, the two arms being joined by links 115 and 116.

Threaded extension 109 of the piston rod is located to engage one arm of a bell crank 117 mounted on the base portion 96, the other arm of the crank being connected with an adjustable rod 118 ending in a roller 119 resting on the base 96 and movable against a stop 120 formed by the base. A spring 121 tends to rotate crank 117 in counterclockwise direction to a sufficient extent to allow the roller 119 to drop back of a latch surface 122 formed on the base portion 96 where the roller is normally retained. A normally deenergized solenoid 126 is connected for energization responsive to any desired condition of the unit which may be employed to close and open an electric circuit and has its core connected by links 127 and 128 with a shaft 129 suitably mounted on the governor base 96. The shaft 129 also has secured thereon a bell crank 131 to one end of which is pivotally connected a push rod 132 having an enlarged head and being guided in its movement in an aperture formed in the governor base 96. The other arms of the crank 131 extend to adjacent the base 96 and can rest against the base as a stop when solenoid 126 is deenergized to permit rotation of the crank 131 in a counterclockwise direction.

When a predetermined emergency arises, which requires only partial shut down of the unit to no load synchronous speed, solenoid 108 is energized to retract latch 107 and solenoid 106 is energized to close valve 101 and open valve 103. Spring 99 then expands to force fluid from under piston 98 and the piston descends until extension 109 engages bell crank 111 and rotates the bell crank counterclockwise to engage link 116 and rotate arm 113, shaft 83 and finger 82 in clockwise direction which presses finger 82 on load limit collar 81 and causes pressure admission through pilot valve 14 to the right hand end of gate servomotor 12, 13 to move the gate 9 in closing direction until the unit has come to no load synchronous speed. During the above action nuts 110 have been brought into contact with one arm of bell crank 117 and further downward movement of piston 98 is arrested.

If the emergency is of such nature as to require complete shut down of the unit, solenoid 126 is energized. Upon such energization, the core of the solenoid 126 is raised and rotates shaft 129 which swings crank 131 clockwise and forces rod 132 upward to raise roller 119 from the surface 122. Pressure due to the spring 99 tends to rotate the crank 117 clockwise and pulls the roller 119 against stop 120, thus allowing crank 117 to rotate and permitting spring 99 to expand fully and move the piston 98 to the extreme end of the cylinder 97. To place the system again in condition for normal starting, solenoid 108 must be energized to remove latch 107 from under link 104 and allow it to return to its normal position and the condition which caused energization of solenoids 106 and 126 must be removed.

When the prime mover generating unit is being started from standstill, it is necessary to prevent opening of the gate beyond the amount required to bring the unit up to synchronous speed at no-load until the flyballs have reached substantially synchronous speed and are therefore in position to assume control of the governing system and hence of the unit. A bracket 136 is mounted on the piston rod of the flyball servomotor 44. A bell crank 137 is mounted on a fixed portion of the governor base adjacent the bracket 136 and one arm thereof carries a link 138 passing through the bracket, the link being screw threaded and having nuts below the bracket to limit the motion, in one direction, of the link relative to the bracket. The other arm of the crank 137 is connected by a rod 139 with a latch member 140 freely pivoted on an arm 141 keyed to the shaft 83. The latch member 140 and the arm 141 are drawn toward each other by a spring 142. The latch member 140 is adapted to contact with a latch member 143 which is rotatably mounted on the shaft 112 and is biased in counterclockwise direction by a spring 144. The latch member 143 has pivoted thereto a link 146 passing through an aperture in one arm of a bell crank 147 keyed on the shaft 112, the other arm of the crank 147 being pivotally connected with the lever 92 which is connected with the load limit crank 87 and with the shaft 62 of the first restoring or relay means.

When the turbine is being started from a normal shut-down position, oil is present in the cylinder 97 which has raised the piston 98 and allowed crank 111 to move out of contact with link 116 thus freeing the shaft 83 from restraint on its rotation. The wheel 41 is then rotated to raise floating lever 38. Pilot valve 14 is then raised to operate the gate servomotor 12, 13 in gate opening direction which rotates pulley 54 in a counterclockwise direction and shifts the rod 92 and the crank 147 attached thereto toward the left. The spring 144 may then pull the latch 143 in a counterclockwise direction to engage with the latch 140. Continued movement of the restoring mechanism continues counterclockwise movement of pulley 54 and pulls rod 92 further toward the left which rocks crank 147 further in a clockwise direction. Spring 144 pulls latch 143 against latch 140 and rotates latch 140 about its connection with rod 139 as a pivot. Such pivot is movable because rod 139 can swing about its connection with the crank 137. The upper end of latch 140 acts on the end of arm 141 to rotate the shaft 83 and to rock the finger 82 toward the collar 81 to prevent opening of the gate 9 beyond a predetermined amount. As the flyballs 48 come up to speed and raise bracket 136 off the nuts on link 138 the spring 142 rotates latch member 140 counterclockwise to disengage from latch member 143. The gates are then under full control of the flyballs 48. The amount of gate vane opening permitted by the above described latching device is determined by the adjustment of the length of link 146. Thus when the effective portion of the link is shortened, the degree of opening of gate vanes is decreased while increase of the effective length of the link 146 increases the amount of gate vane opening permitted.

If for any reason, such as need for repairing of the automatic control portions of the governor system, it is necessary that such automatic portions be put out of operation; the prime mover generating unit may be continued in operation under manual control. Such control includes a manually operated valve 151 receiving pressure from the pipe 32 through a valve 152 and allowing flow of pressure to the opening and closing sides respectively of the gate operating servomotor 12, 13 by way of valves 153 and 154.

Pressure is discharged from the manual pilot valve 151 back to the oil pressure source by way of a pipe 156. The valves 152, 153 and 154 are shown as being of the rotary type and as having their several stems interconnected by common operating means 157 which is actuated by a single hand wheel 158. The valves 152, 153 and 154 are shown as controlling the flow of pressure to both the automatic pilot valve 14 and the manual pilot valve 151 from a single set of pipes but it will be understood that other arrangements of pipes and valves may be used so long as means are provided for simultaneously changing all connections from automatic pilot valve 14 to manual pilot valve 151. The stem 159 of the manually operated pilot valve 151 has pivotally connected therewith a lever 161, the ends of which are connected by way of links 162 and 163 with one arm each of bell cranks 164 and 165 respectively which bell cranks are pivotally mounted on convenient portions of the governor base. One arm of the crank 164 is connected by way of a rod 167 with the rod 92 and accordingly receives relayed motion resulting from movement of the gate operating servomotor 12, 13. One arm of the crank 165 is connected by way of rod 168 with the traveling nut 88 of the load limit device. Pilot valve 151 may therefore be operated manually by operating wheel 91 to control the flow of fluid pressure to the gate servomotor 12, 13, but all movements of the gate servomotor are relayed back to the valve 151 returning the valve to the neutral position after each movement thereof and the valve cannot be opened beyond the position determined by the setting of the load limit means.

Hydraulic turbines in which the runner vanes are adjustable can operate at their maximum efficiency only if a predetermined relation is maintained between the runner vane setting and the gate vane opening and such relation must be variable for different heads under which the turbine is to operate. The runner vanes are operated or adjusted by the servomotor 19, 20 responsive to fluid pressure controlled by the pilot valve 28. Operation of the gate servomotor 12, 13 causes movement of the relay cable 51 which rotates pulley 55 mounted on a fixed portion of the governor base. The rotation of the pulley acts through rod 171 on an arm 172 keyed on a shaft on which is secured a holder 173 for a plurality of cams 174 having different cam surfaces formed to give the proper runner vane setting-gate opening relation for different heads. A cam follower 176 rides on the surface of one of the cams 174 and transmits cam movement to a shaft 177.

Movement of the shaft 177 is transmitted to a lever 182 mounted on the shaft and connected through a compression spring connection 183 with a cam 184 rotatable on the shaft and grooved in one end to provide a seat for a cable 185 which is used to allow placing of the governing system at a considerable distance from the prime mover itself. The cable 185 extends from the cam 184 to a similar cam 186 mounted on a pivot 187 which is on or closely adjacent pilot valve 28 which is itself mounted on or adjacent the prime mover-generating unit. An arm 188 is connected with cam 186 and is connected by way of a link 189 with a floating lever 191 to which is connected the stem 29 of the pilot valve 28. The other end of the floating lever 191 is connected by way of a link 192 with a cross head 193 guided in vertical movement by the walls of the oil distributing head 26, 27 and connected to a rod 194 mounted on the tube 23 and therefore movable with such tube. A dashpot 213 with an adjustable valve 214 is mounted adjacent the cam 184 and is connected therewith to obtain smooth and regular movement of the linkage required for movement of the valve 28. The rate of movement of the dashpot is controlled by adjustment of the valve 214 for controlling the by-passing of fluid around the piston of the dashpot. The dashpot regulates the speed of movement of the runner vane control means which vary the action of the gate operating means and the spring 183 allows overtravel of the runner control means in the direction of adjustment of the vanes to steep position.

When an adjustable vane propeller turbine is shut down, the gates are closed and the runner vanes are turned to flat position. In such flat position of the runner vanes, the runner vanes can, however, produce only a very small torque and it is desirable to set the runner vanes initially in steep position and to return the runner vanes to the control of the proper cam only after the turbine has commenced rotating. A power cylinder 196 is mounted adjacent the cams 174 and is provided with a piston 197 under the compression of a spring 198. Fluid pressure may be admitted to the cylinder 196 from the pipe 31 through valve 199 and may discharge from the cylinder through valve 200. The two valves 199 and 200 are under spring pressure and are interconnected to be operated by the same lever 202 actuated by a solenoid 203 which may be energized either automatically or under manual control during starting of the turbine or when the turbine is to be started. Upon opening of the valve 199 fluid pressure lifts the piston 197 and the piston rod rises into contact with a lever 204 which is keyed to the shaft 177 and is capable of rotating the shaft to lift the follower 176 off cams 174 and to cause movement of the linkage necessary to operate the pilot 28 in a direction to admit pressure to the upper side of the runner servomotor 19, 20 for moving the runner vanes into steep position. Upward movement of piston 197 is limited by a stop 195 threaded into cylinder 196 and having the rod of piston 197 passing therethrough. After the turbine has commenced rotating, solenoid 203 is deenergized and valves 199 and 200 are closed and opened respectively to allow discharge of pressure from the cylinder 196. The spring 198 then returns the piston 197 to the end of the cylinder and the entire cam follower mechanism connected with lever 204 returns to the initial position thus bringing cam follower 176 again to the surface of the cams 174 which then take over the control of the pilot valve 28 in a predetermined relation to the movement of the gate operating means.

If some emergency requires that the oil pressure necessary for operating the entire governing system be conserved, it is essential that the runner vane movement be temporarily interrupted. Mechanical locking means are therefore provided for preventing operation of the valve 28 so long as the oil pressure is below a predetermined value. A gear sector 206 is keyed on the shaft 177 and engages a gear 207 mounted on or formed as portion of a brake drum 208. A plurality of brake shoes 209 are pivoted for movement into and out of contact with the drum 208 and are interconnected by a linkage 210 which is connected with the core of solenoid 211. Energization of the solenoid 211 is preferably controlled responsive to oil pressure so as to energize the solenoid when the oil pressure drops below a predetermined value. The brake shoes 209 are then drawn against the brake drum 208 and the valve 28 is held in fixed position until the oil pressure rises and again causes deenergization of the solenoid 211.

For purposes of simplicity of illustration and description, the synchronizing screw 39 and the load limit screw 89 have been shown in Fig. 1 as being locally and manually operated whereas it is desirable that each of such screws be provided with remotely controllable reversible power operating means in place of reversible hand wheels 41 and 91. Such means are shown in Fig. 2 as electric motors 216 and 217, respectively. When such electric motors are used, it is necessary to provide means which will prevent overtravel of the synchronizing screw 39 in the gate opening direction after the gate has reached its predetermined maximum load position. An arm 218 is fixed on shaft 83 and carries a switch 219 which is shown as being of the tilting mercury type, for controlling the opening and closing of an electric circuit 220 of the motor 216, the switch being responsive to the movement of the shaft 83. The switch 219 is so placed that circuit 220 is interrupted when the load limit finger 82 contacts with collar 81 and the motor 216 cannot then be further energized.

Overtravel in gate closing direction of the load limit screw operating motor 217 is prevented by interruption of the circuit 223 thereof upon operation of a switch 224 which is mounted on an arm 225 pivoted on the governor base 96. The arm 225 is connected through a spring 226 with an arm 227 fixed on the shaft 129 which is rotatable upon energization of the solenoid 126. The arm 225 is also pivotally connected with a tube 229 within which slides a rod 230 pivotally mounted on a crank 231 rotatable about a fixed point 232 and having a slot engaging a pin 233 projecting from the traveling nut 88 of the load limit adjusting means. When the crank 231 is in the position at which the turbine gate is closed, the end of the rod 230 abuts on a pin inserted in one of the pairs of holes 234 in the tube 229, and the switch 224 cannot be closed. Energization of the solenoid 126 which pulls up on the arm 227 then merely stretches spring 226 because movement of the arm 225 is blocked by abutment of the rod 230 on the pin in the tube 229.

The sequence of operation of the governing system will now be briefly described from the normal shut down position shown in Fig. 1 of the drawings through the starting operation, power limiting action, partial shut down to no load synchronous speed and complete shut down of the unit. Starting of the system involves only rotation of the synchronizing screw 39 to raise the gate pilot valve 14 and energization of the solenoid 203 to cause the piston 197 to raise the runner pilot valve 28. Gate 9 is then opened until the relayed movement of servometer 12, 13 acts through rod 92 to cause latch member 143 to engage latch member 140 which rotates finger 82 clockwise into contact with collar 81. The degree of opening of gate 9 is thus limited by the setting of latch 140, 143. Raising of the runner pilot valve 28 admits pressure on top of the runner servomotor piston 19 to place the runner vanes 17 in steep position for starting. Adjustment of the synchronizing screw 39 is continued until flyballs 48 are extended at approximately synchronous speed of the unit when the bracket 136 is lifted by the flyball servomotor 44 to allow movement of the latch member 148 whereupon latch 140, 143 is disengaged by the action of springs 142 and 144. Solenoid 203 is then deenergized and cam follower 176 comes to rest on a predetermined cam surface 174 to allow the runner pilot valve 28 to discharge sufficient pressure to bring the runner vanes 17 back to the position determined by the contour of cam 174 then under the cam follower 176. The power limiting screw 89 is then rotated to place finger 82 in such relation to collar 81 as is desired to limit the power output of the unit to a predetermined value. The unit is now in full operation under the control of the flyballs and will deliver power up to the maximum limit set and at only such speed variations as are permitted by adjustment of the speed droop control modifying the connections for restoring the gate pilot valve 14 to its mid position.

Upon the occurrence of a temporary and not dangerous abnormal operating condition, solenoids 106 and 108 are energized to allow discharge of pressure from the power cylinder 97, 98. Spring 99 forces piston 98 down and raises crank 111 into contact with link 116. Downward movement of piston 98 continues until the piston rod engages crank 117 which prevents the piston from moving to the extreme end of the cylinder. Shaft 83 is rotated to bring finger 82 down on collar 81 to cause gate pilot valve 14 to discharge sufficient pressure from the gate servomotor 12, 13 to close the gate to the extent at which the unit will operate at synchronous speed under no load only. If an abnormal condition occurs which is dangerous to continued operation of the unit, solenoid 126 is energized and raises push rod 132 to force roller 119 off surface 122 to trip crank 117 which then allows spring 99 to push piston 98 to the end of cylinder 97 and raises crank 111 further to force finger 82 down on collar 81 with sufficient pressure to move the gate pilot valve 14 to the position at which full fluid pressure is admitted to the right hand side of the gate servomotor 12, 13 to close gate 9 completely. Such complete closing of gate 9 of course also so adjusts runner pilot valve 28 as to place the runner vanes 17 in flat position. The machine is then completely shut down and solenoids 106 and 126 must be deenergized and 103 energized to again place the shut down device in the position shown before the system can be restarted.

It is believed that the operation of the several locks for the runner vanes, of the interlocks for the power limit and synchronizing screws and of the manually operable valve, have been so clearly described that further description is not required of the separate operations of such means which do not enter the ordinary sequence of operations of the governing system.

It will therefore be understood that the present invention provides normally operating means including a pilot valve 14 and the servomotor 12, 13 for operating the gate 9. Such gate operating means is controlled by speed responsive means including motor 49, flyballs 48, servomotor 44 and leverage 43, 42 and 28. The gate pilot valve 14 and the servomotor 12, 13 are returned to mid position by the cable 51 acting through pulley 54 on the dashpot 58—81 and through leverage 66, 67 on the leverage 43, 42 and 38. Such restoring action is modified by the leverage 71, 72, 74 and 76 to permit a predetermined speed droop. The means for limiting the degree of gate opening during starting includes the bracket 136 acting on the leverage 137, 139, the latch 140 and the finger 82 cooperating with the rod 92, crank 147 and latch 143 actuated from the restoring means. Finger 82 also acts as a portion of the maximum power output limiting means which includes the rod 92, crank 87, link 86 and arm 84. The runner vane control mechanism includes normally operating means which are required for steep tilting of the runner vanes during starting and which comprises valves 199 and 200, power cylinder 196, 197 and lever 204 acting on the mechanism for maintaining a predetermined relation between gate position and runner vane position during normal running of the unit. Such runner vane control mechanism includes a plurality of cams 174 and cam follower 176 acting through an over-travel spring 183, under the modifying action of a dashpot 195, on the runner pilot valve 28 connected to the leverage 188—194 for actuating the valve 28 and for restoring such valve to mid position after each movement of the runner servomotor piston 19.

The system also includes a plurality of means responsive to abnormal conditions and affecting the operation of the gate servomotor 12, 13 and the runner vane servomotor 19, 20 respectively. Partial closure of gate 9 to no load synchronous speed is obtained by action of the valves 101 and 103 controlling flow of pressure to the power cylinder 97, 98, which acts on finger 82 through the leverage 116, 113 and the shaft 82. And complete closure of gate 9 is obtained by tripping of the crank 117 upon actuation of the push rod 132 under control of the solenoid 126. The automatically operating valve 14 may be superseded by manually operable means including valves 152, 153 and 154 and valve 151 which is interconnected with the restoring means by way of rod 167 and with the power limit means by way of rod 168. The position of the runner vanes 17 is fixed on the occurrence of abnormal conditions by the brake 208 to 211 inclusive and by valves 247 and 248 acting on the power cylinder 244, 245 to actuate the valves 241 and 242 which lock the runner vane mechanism mechanically and hydraulically respectively.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a governing system for a prime mover having a gate controlling the flow of fluid thereto, a pressure operated servomotor for operating the gate, a pilot valve movable away from the mid-position thereof for controlling pressure flow to said servomotor, means responsive to the speed of the prime mover for automatically actuating said valve, means actuated by said servomotor for restoring said valve to mid-position, and manually operable means superseding pilot valve in the control of said servomotor.

2. In a governing system for a prime mover having a gate controlling the flow of fluid thereto, a pressure operated servomotor for operating the gate, a pilot valve movable away from the mid-position thereof for controlling pressure flow to said servomotor, means responsive to the speed of the prime mover for automatically actuating said valve, means actuated by said servomotor for restoring said valve to mid-position, means for limiting the power output of the prime mover, manually operable means for superseding said pilot valve in control of said servomotor, and means connecting said manually operable means with said restoring means and with said power limit means.

3. In a governing system for a prime mover having a gate controlling the flow of fluid thereto, a pilot valve controlling operation of the gate, means responsive to the speed of the prime mover for moving said pilot valve away from the mid-position thereof to cause movement of the gate means for restoring said pilot valve to the mid-position thereof, means connecting said pilot valve with said restoring means to limit the power output of the prime mover, and an adjustable leverage so associated with said restoring means as to limit the degree of normal speed droop of the prime mover.

4. In a governing system for a prime mover having a gate controlling the flow of fluid thereto, a pilot valve controlling operation of the gate, means responsive to the speed of the prime mover for moving said pilot valve away from the mid-position thereof to cause movement of the gate means for restoring said pilot valve to the mid-position thereof, means connecting said pilot valve with said restoring means to limit the power output of the prime mover, motor operated means for moving said pilot valve in gate opening direction independently of said speed responsive means, and a switch opened by said power limiting means upon engagement thereof with said pilot valve and interrupting the circuit of the motor.

5. In a governing system for a prime mover having a gate controlling the flow of fluid thereto and in which opening of said gate is controlled during starting to prevent overspeeding, means responsive to the speed of the prime mover, means for operating said gate, a pilot valve movable from mid-position for controlling movement of said gate operating means, a linkage connecting said speed responsive means with said pilot valve, means connected with said linkage for moving said pilot valve from its mid-position during starting, restoring mechanism associated with said gate operated means and with said linkage for returning the pilot valve to mid-position, a finger adapted to be moved into and out of position coacting with a movable part of said valve for preventing movement, during starting of said prime mover, of said valve from mid-position by said means for moving said valve, latch means controlled by said restoring mechanism and tending to position said finger to prevent movement of said pilot valve, and means connecting said speed responsive means and said latch means and tending to move said finger out of position for preventing movement of said pilot valve, said latch means and its associated means cooperating to prevent opening of said gate until said speed responsive means attains a speed directly proportional to the speed of the prime mover and thereby preventing overspeeding thereof.

6. In a governing system for a prime mover having a gate controlling the flow of fluid thereto and in which opening of said gate is controlled during starting to prevent overspeeding, means responsive to the speed of the prime mover, means for operating said gate, a pilot valve movable from mid-position for controlling movement of said gate operating means, a linkage connecting said speed responsive means with said pilot valve, means connected with said linkage for moving said pilot valve from its mid-position during starting, restoring mechanism associated with said gate operated means and with said linkage for returning the pilot valve to mid-position, a finger adapted to be moved into and out of position coacting with a movable part of said valve for preventing movement, during starting of said prime mover, of said valve from mid-position by said means for moving said valve, latch means controlled by said restoring mechanism and tending to position said finger to prevent movement of said pilot valve, means connecting said speed responsive means and said latch means and tending to move said finger out of position for preventing movement of said pilot valve, said latch means and its associated means cooperating to prevent opening of said gate until said speed responsive means attains a speed directly proportional to the speed of the prime mover and thereby preventing overspeeding thereof, and means for adjusting said latch means to determine the position at which said finger becomes effective for preventing movement of said pilot valve from mid-position.

7. In a governing system for a prime mover having a gate controlling the flow of fluid thereto and in which opening of said gate is controlled during starting to prevent overspeeding, means responsive to the speed of the prime mover, means for operating said gate, a pilot valve movable from mid-position for controlling movement of said gate operating means, a linkage connecting said speed responsive means with said pilot valve, means connected with said linkage for moving said pilot valve from its mid-position during starting, restoring mechanism associated with said gate operated means and with said linkage for returning the pilot valve to mid-position, a finger adapted to be moved into and out of position coacting with a movable part of said valve for preventing movement, during starting of said prime mover, of said valve from mid-position by said means for moving said valve, latch means controlled by said restoring mechanism and tending to position said finger to prevent movement of said pilot valve, said latch means comprising a plurality of coacting members, one of said members being actuated by said speed responsive means and the other of said members being actuated by said restoring mechanism, and means connecting said speed responsive means and said latch means and tending to move said finger out of position for preventing movement of said pilot valve, said latch means and its associated means cooperating to prevent opening of said gate until said speed responsive means attains a speed directly proportional to the speed of the prime mover and thereby preventing overspeeding thereof.

8. In a governing system for a prime mover having a gate controlling the flow of fluid thereto and in which opening of said gate is controlled during starting to prevent overspeeding, means responsive to the speed of the prime mover, means for operating said gate, a pilot valve movable from mid-position for controlling movement of said gate operating means, a linkage connecting said speed responsive means with said pilot valve, means connected with said linkage for moving said pilot valve from its mid-position during starting, restoring mechanism associated with said gate operating means and with said linkage for returning the pilot valve to mid-position, a finger adapted to be moved into and out of position coacting with a movable part of said valve for preventing movement, during starting of said prime mover, of said valve from mid-position by said means for moving said valve, latch means controlled by said restoring mechanism and tending to position said finger to prevent movement of said pilot valve, said latch means comprising a plurality of coacting members, one of said members being actuated by said speed responsive means and the other of said members being actuated by said restoring mechanism, means connecting said speed responsive means and said latch means and tending to move said finger out of position for preventing movement of said pilot valve, said latch means and its associated means cooperating to prevent opening of said gate until said speed responsive means attains a speed directly proportional to the speed of the prime mover and thereby preventing overspeeding thereof, and means for severally adjusting the initial positions of said latch members.

9. In a governing system for a prime mover having a gate controlling the flow of fluid thereto, a pilot valve controlling operation of the gate, means responsive to a departure of the prime mover from normal speed for moving said pilot valve away from the mid-position thereof and causing movement of the gate, means responsive to gate movement for restoring said pilot valve to the mid-position thereof, means associated with said pilot valve and with said restoring means to limit the power output of the prime mover, motor operated means for adjusting the setting of said power limiting means to adjust the load limit of the prime mover, a circuit for said motor including a switch, said switch being so associated with said power limit means as to be capable of being closed when said power limit means has a setting corresponding to gate open positions and as to be incapable of being moved into closed position when said power limit means is in gate closed position.

JOSEPH J. RING.
BEVERLY R. NICHOLS.